INVENTOR.
GLENN B. BRITTAIN

INVENTOR.
GLENN B. BRITTAIN
BY
HIS AGENT

United States Patent Office 3,579,626
Patented May 18, 1971

3,579,626
METHOD FOR CURING TIRES AND THE LIKE
Glenn B. Brittain, Amiens, France, assignor to The Goodyear Tire & Rubber Company, Akron, Ohio
Filed Oct. 30, 1968, Ser. No. 771,757
Int. Cl. B29h 5/01, 5/02
U.S. Cl. 264—297
19 Claims

ABSTRACT OF THE DISCLOSURE

A method for curing tires in a bladder-equipped press. During the main heating period, the bladder is filled first with steam to conform the tire and bladder to the mold and to begin the cure of the tire. The steam is then replaced with water at a high pressure and at a temperature approximately equal to the maximum permissible vulcanizing temperature so as to maintain the tire against the mold and to continue the cure. In the final phase of the main heating period, steam at a high pressure at least equal to the vapor pressure of the water is utilized to force the water, without vaporization, from the bladder without interruption of the curing operation. The remaining steam is then vented to the atmosphere. In this manner, the water used to cure the tire can be reused without a change of state and the bladder is maintained at a high temperature for subsequent curing cycles.

---

Figure 1:
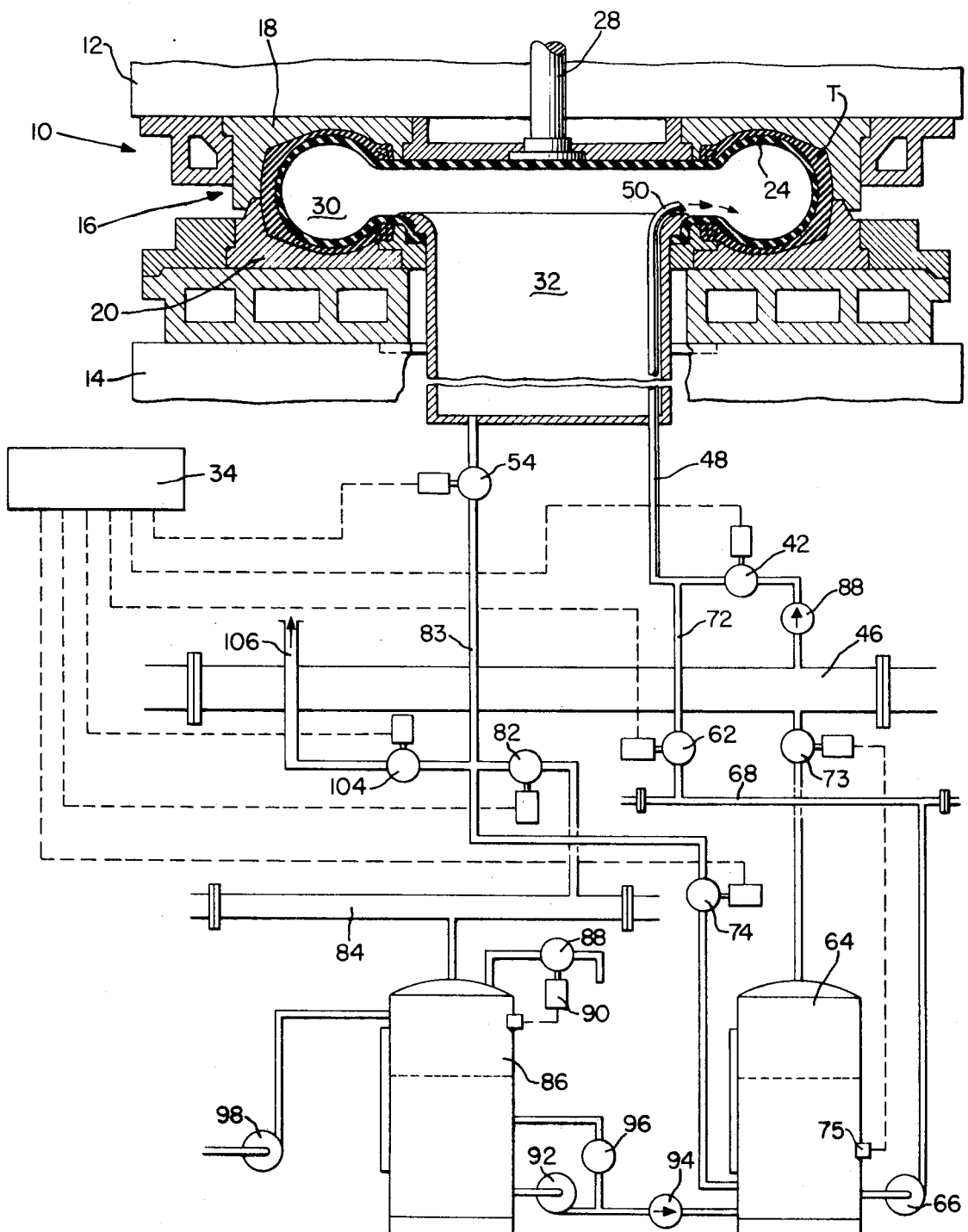

The foregoing abstract is not to be taken as limiting the invention of this application, and in order to understand the full nature and extent of the technical disclosure of this application, reference must be made to the accompanying drawings and the following detailed description.

This invention relates to the curing of vehicle tires and like vulcanizates and particularly to a method using hot compressed water for curing, or molding and curing, the tire.

For reasons too well known to require detailed explanation, the use of high pressure hot water to accomplish the cure of tires and similar articles has been widely adopted. It is now common to use compressed hot water particularly in presses employing a bladder or bag to shape the tire into conformity with the interior surface of a mold, as well as to contain a fluid used to supply pressure and heat to the tire. In order safely to discharge or remove compressed water from the bladder, it has heretofore been common practice to introduce relatively cool water into the cavity in an amount at least sufficient to reduce the temperature of the hot water below the normal boiling point at atmospheric pressure, 212° F. or 100° C., so that the liquid does not flash or explode into steam upon its release from the high pressure. This procedure, while safe, is not only wasteful of heat energy and of water but tends to cool the apparatus and particularly the bladder with disadvantages to the economy of normal continuous production of cured tires. Compressed water refers to the liquid at a pressure and heat content (or temperature) that at any reduction of pressure the liquid becomes vapor (steam).

It is, therefore, a principal object of the present invention to reduce the curing-press cycle time and thereby to increase the capacity of a tire molding and curing unit with respect to the cycle time and capacity of a conventional hot water cure.

A further object of the invention is to improve the thermal efficiency of a tire cure by reducing the quantity of heat required as compared to the conventional hot water cure procedure.

Another object of the invention is to improve the quality of molding by increasing the conformability of the bag or bladder, particularly at the time when the uncured tire is brought into contact with the bladder so that the bladder may conform more quickly and more readily to the tire cavity and begin earlier in the curing cycle to deliver heat to the tire being cured.

Yet another object is to reduce the quantity of heat energy lost from the apparatus at the end of a single curing cycle and to retain the curing apparatus at a higher level of temperature and heat content during the unloading and loading interval, i.e., the term or period between the removal of the cured tire from the mold and the insertion thereinto of a next succeeding uncured tire.

The foregoing objects and other objects and advantages which will be particularly pointed out or will become apparent as the description proceeds are accomplished according to the instant invention by providing for the discharge of the compressed liquid, such as high pressure hot water, from its heat exchange relation with the tire or other article into receiving means maintained at a pressure above atmospheric pressure and preferably not less than the saturation pressure of the liquid removed or discharged from its heat exchange relation with the tire. Further, the invention provides that the hot liquid be driven out or purged from the heat exchange relationship with the tire by a hot gas, such as steam, at a pressure and for a time period sufficient to drive all or nearly all of the hot liquid into the receiving means, said gas having a temperature greater than the temperature of said liquid. At the end of the purge period or term the gas or steam which has displaced the liquid, being at a pressure approximately equal to that of the receiving means, is vented to atmosphere. Further to augment the improvement in press cycle time and to retain fully the benefits of the gas driven discharge of the liquid, the curing cycle according to the invention may further include the admission of hot gas or steam into the bladder within the tire to initiate the curing cycle immediately upon the closing of the tire mold, said gas having a temperature greater than the temperature of said liquid.

Figure 2:
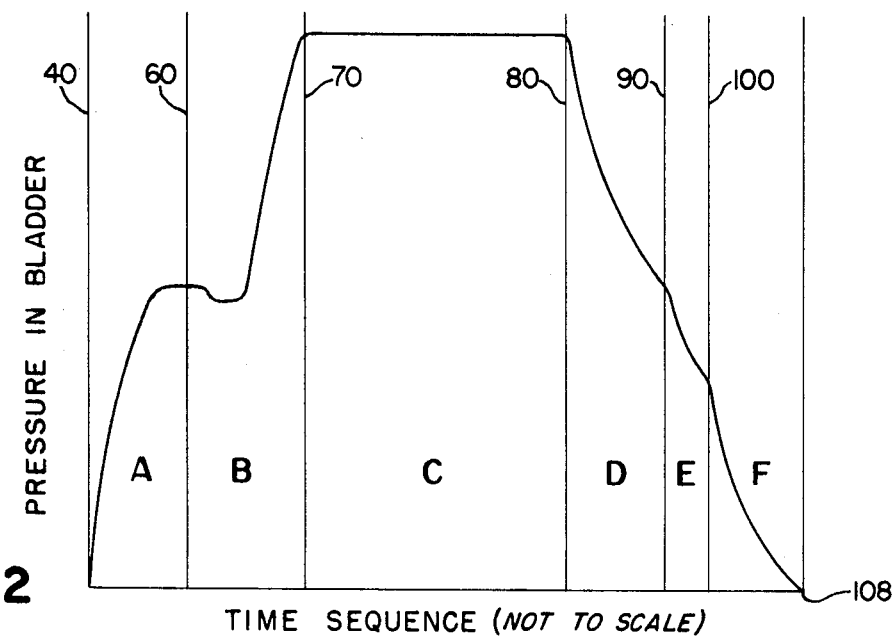
Figure 3:
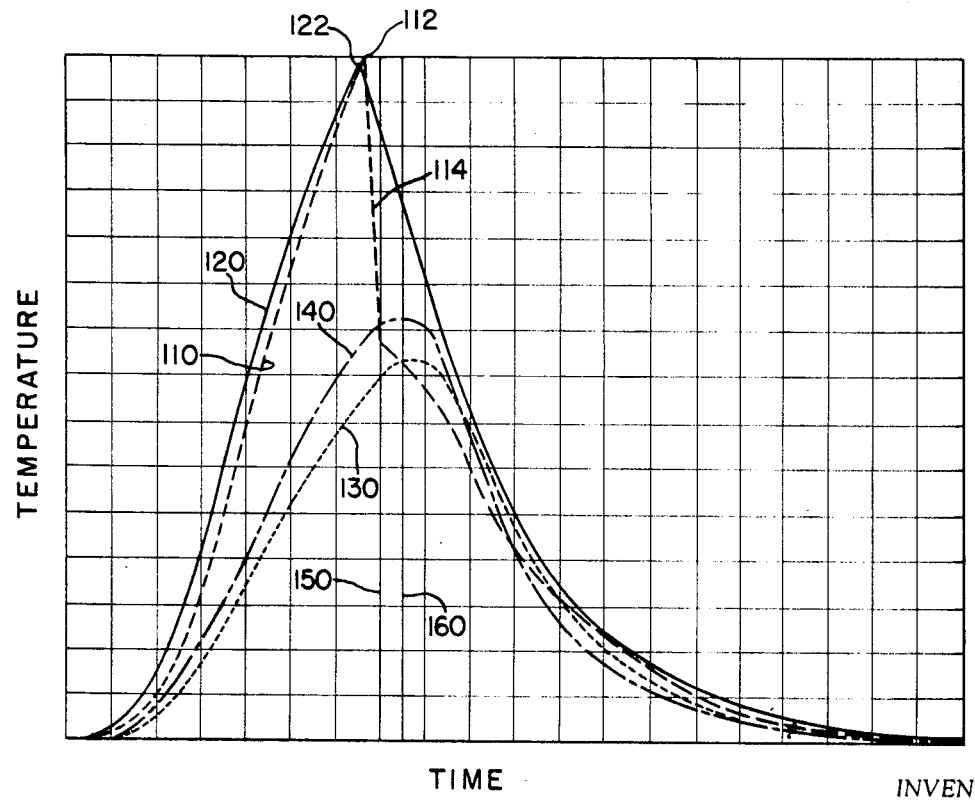

As the description proceeds, reference will be made to the annexed drawings forming a part of the present specification, in which:

FIG. 1 is a schematic representation of an arrangement of apparatus according to the instant invention;

FIG. 2 is a graphic representation of the successive pressures of heat transfer fluids with respect to the time sequence of pressure events within the bladder of the apparatus shown in FIG. 1; and FIG. 3 is a graphic representation of temperature attained in certain parts of a tire in accordance with the present invention compared to temperatures attained in the practice of a conventional hot water cure.

The invention is particularly adapted, although not so limited, for practice in connection with tire molding presses in general use. Shown in FIG. 1, the system according to the invention includes a portion of such a press 10 having an upper platen 12 and a lower platen 14 each of which is adapted to supply heat to a tire mold 16 having an upper portion 18 attached to the upper platen 12 and a lower portion 20 attached to the lower platen 14. Drive means (not shown) are provided to move one of the platens, the platen 12, toward and away from the other platen to close and to open the mold 16 in the usual manner. The press 10 includes a bladder 24 mounted upon suitable mechanism 28 for withdrawing the bladder from, or deploying the bladder into, the interior cavity 30 of a tire to be cured.

The curing cycle is begun by placing a green or uncured tire T into the mold 16 in a conventional manner, the press 10 being open. The drive means is actuated, beginning movement of the platen 12 to close the mold valve 42 is closed, in the chamber 32 and the cavity 30 are rapidly exhausted to atmospheric drain, during the fraction F of the cycle, FIG. 2. Pressure within, or acting on, the tire is reduced to the pressure of the surrounding atmosphere, point 108, at which time the mold 16 is opened and the tire T removed to subsequent processing in the conventional manner while said bladder member has a mean temperature near the temperature of said liquid.

The system provides further the advantage that substantially all of the hot water used is not only retained for reuse but is retained as liquid at a pressure and temperature well above saturation temperature at atmospheric pressure. Moreover, the heating medium as either liquid or vapor which is discharged to atmosphere and lost is reduced substantially to the volume required to fill the cavity 30 and chamber 32. In addition to providing driving pressure differential to accelerate drainage of the liquid from the cavity 30, the hot gas or steam provides the additional advantage of maintaining or slightly increasing the mean temperature of the apparatus including the bladder so that the time and heat energy required to begin the cure of a next succeeding tire are thereby materially reduced.

Results of the practice of the present invention are compared with results obtained by a prior conventional method and are shown in FIG. 3.

In FIG. 3, the curve 110 is a plot of temperature with respect to time, the temperature being measured at a point located between the first or inmost ply and the second or next radially outward ply at the equatorial plane of the tire. In general this location in pneumatic tires is most subject to harmful effects of excessive temperature or cure effect. As is well known, the amount of cure effected is represented by the area under the curve of temperature versus time and is usually expressed in arbitrary units. The cure effect is shown by curve 110 in an F70–14 passenger car tire to be 20.7 units, up to the time of the maximum temperature point 112. The effect of the introduction of cold water, discussed previously, is shown as an abrupt drop in the measured temperature, the portion 114 of curve 110.

In accordance with the present invention, the high pressure hot water within the cavity is not chilled. Rather, the hot water is drained as water, which is to say without change of state from the liquid to the vapor, to the pressure receiving means as has been described. The drainage from the bladder cavity 30 takes place so rapidly that no significant amount of heat will be transferred to the tire during the fraction D of the cycle.

A particular object of the invention is to provide a method for curing tires which will attain results at least as desirable as can be obtained with conventional hot water cure.

The curve 120 also is a plot of temperature with respect to time, measured in a tire like, in all material respects, the tire discussed in connection with the curve 110, except that its cure was accomplished in accordance with the present invention. The maximum attained temperature at the point of measurement between the first and second plies at the equatorial plane is approximately the same as in the tire of curve 110, and is indicated in the curve 120 at point 122. The cure effect, represented by the area under the curve 120 up to the point 122 is 21.1 units, an increase of the order of 2% over that of curve 110.

The amount or effect of cure moreover is attained in a time shorter by about 2% than the time required in the previously described tire of curve 110. Comparison of the curves 110 and 120 shows that the temperature rise of curve 120 begins earlier in the cycle and rises, initially, at a greater rate than does the temperature of curve 110. The difference can be attributed to the higher mean temperature of the press and of the bladder at the beginning of the cure cycle, as previously described.

The temperature and amount of cure achieved in the shoulder region of an F70–14 passenger car tire by the methods of the prior art and of the present invention are shown respectively by the curves 130 and 140 of FIG. 3. The points of measurement in the shoulder regions of the tires were located at a distance of one-third of the total of greatest thickness, measured from the interior surface.

It will be apparent that the tire cured in accordance with the present invention, as shown in curve 140, has achieved a significantly greater cure, about 12.6%, in this region well known to be more difficult of cure, than has the identical region in the tire represented by the curve 130 cured in accordance with the methods of the prior art. The amount of cure represented by the curve 130 is equivalent to 10.4 units while the amount of cure represented by the curve 140 is equivalent to 11.9 units, both measured to the instant of press opening.

It will also be apparent from FIG. 3 that the press can be opened and the tire removed in a shorter length of time with the present invention than with method of the prior art. The line 150 represents the time at which the press is opened in the method of the present invention, while the line 160 represents the time at which the press is opened in the practice of the conventional hot water cure. The difference will be seen in FIG. 3 to represent a saving of about one minute in fifteen minutes of press curing time, or a gain in productivity of approximately 6%.

It will be appreciated, from the foregoing description and from FIG. 1, that the system disclosed may serve one or a plurality of presses and tire molds. The steam supply means 46, the hot water supply header 68 and the receiving means header 84 can readily be adapted for connection to more mold presses than the single press shown, the heater 64 and the holding tank 86 being suitably sized to suit the particular number of tire molds connected therewith.

It will be recognized that specific temperatures, pressures and times selected have application only to a particular size and type of tire. As is well known, the quantity of cure required in terms of time and temperature depends upon the materials of construction including the particular rubber compounds, the amount and kind of fabric or other reinforcing materials used and upon the size and shape of the particular tire to be cured. Moreover, the principles of the present invention may be applied readily by persons skilled in the art to other vulcanizates than pneumatic tires.

While certain representative embodiments and details have been shown for the purpose of illustrating the invention, it will be apparent to those skilled in this art that various changes and modifications may be made therein without departing from the invention.

What is claimed is:

1. In the method of curing pneumatic tires in a bladder-equipped press, wherein during the main heating period the bladder is filled with a liquid heating medium at a high pressure to force and maintain the tire being cured against the surfaces of the mold and at a temperature approximately equal to the maximum permissible vulcanizing temperature; the improvement in emptying the bladder of the liquid heating medium comprising the step of introducing into the bladder, in the final phase of each main heating period, a gaseous medium under a high pressure and heated to a temperature greater than the temperature of said liquid while opening the discharge piping connected with said bladder to enable said liquid heating medium to be expelled from said bladder by said gaseous medium without any interruption of the curing operation, removing said tire from said press while said bladder member has a mean temperature which materially reduces the time and heat energy required to begin the cure of the next tire.

2. A method as claimed in claim 1, wherein said liquid heating medium is expelled from said bladder to a receiver maintained at a pressure less than the first said 17. The method of claim 14, wherein the duration of action of said gaseous or vaporous medium is limited by the use of discharge piping having free cross-sections predetermined as a function of the pressure of said gaseous or vaporous medium to assure the substantially complete evacuation of said liquid heating medium from said bladder before any overcure can occur.

18. The method of claim 14, wherein said gaseous or vaporous medium is steam.

19. The method of claim 14, wherein said liquid heating medium is water, and said gaseous or vaporous medium is steam at a temperature corresponding to the required emptying presusre.

References Cited

UNITED STATES PATENTS

| 1,500,700 | 7/1924 | Blaker | 264—315 |
|---|---|---|---|
| 2,204,513 | 6/1940 | Sandberg et al. | 18—17W |
| 3,329,748 | 7/1967 | Hugger | 264—315X |
| 3,489,833 | 1/1970 | Lehnen | 264—315 |

ROBERT F. WHITE, Primary Examiner

J. H. SILBAUGH, Assistant Examiner

U.S. Cl. X.R.

18—2, 17; 264—315, 347